United States Patent [19]

Gouttebessis et al.

[11] Patent Number: 5,233,146
[45] Date of Patent: Aug. 3, 1993

[54] METHOD AND DEVICE FOR MELTING AN ORGANIC PRODUCT WITH THE USE OF MICROWAVES

[75] Inventors: Jacques Gouttebessis, Volvic; Alain Germain, Bagneux, both of France

[73] Assignee: Compagnie Generale des Etablissements Michelin - Michelin & CIE, Clermont-Ferrand Cedex, France

[21] Appl. No.: 661,559

[22] Filed: Feb. 26, 1991

[30] Foreign Application Priority Data

Feb. 28, 1990 [FR] France ................. 90 02610

[51] Int. Cl.⁵ ................................. H05B 6/80
[52] U.S. Cl. .................... 219/10.55 M; 219/10.55 A; 219/10.55 F; 366/147
[58] Field of Search ............... 219/10.55 M, 10.55 A, 219/10.55 R, 10.55 F; 522/1, 3, 4, 86; 366/78, 97, 100, 144, 147, 192, 196; 264/24, 25, 26, 68, 69, 211.17, 211.2, 345; 425/378.1, 378 R

[56] References Cited

U.S. PATENT DOCUMENTS

| | | |
|---|---|---|
| 4,004,122 | 1/1977 | Hallier ................. 219/10.55 A |
| 4,144,986 | 3/1979 | Smith et al. ................. 282/52 |
| 4,330,698 | 5/1982 | Sawada et al. ................. 219/10.55 A |
| 4,339,648 | 7/1982 | Jean ................. 219/10.55 M |
| 4,400,604 | 8/1983 | Ohtsuka et al. ................. 219/10.55 M |
| 4,436,458 | 3/1984 | Wisdom et al. ................. 366/196 |
| 4,673,782 | 6/1987 | Koepke et al. ................. 219/10.55 M |
| 4,824,355 | 4/1989 | Lenhardt ................. 425/378.1 |

FOREIGN PATENT DOCUMENTS

| | | |
|---|---|---|
| 961102 | 11/1949 | France . |
| 0171309 | 2/1986 | France . |
| 2599665 | 12/1987 | France . |
| 2122859 | 1/1984 | United Kingdom . |

Primary Examiner—Bruce A. Reynolds
Assistant Examiner—Tuan Vinh To
Attorney, Agent, or Firm—Brumbaugh, Graves, Donohue & Raymond

[57] ABSTRACT

A method and device (1) for melting an organic product (4) by microwaves. The device (1) comprises electromagnetic field produced by at least one waveguide (6) for microwaves fastened to a metal receptacle (3) containing the initial solid organic product (4). The microwaves effect the melting of the solid (4) with the formation of an upper liquid layer (11). Means (12) make it possible to erode the still solid part of the product (4) which is in contact with the liquid (11).

22 Claims, 2 Drawing Sheets

METHOD AND DEVICE FOR MELTING AN ORGANIC PRODUCT WITH THE USE OF MICROWAVES

BACKGROUND OF THE INVENTION

The present invention relates to devices and methods employing microwaves.

Microwave ovens are well-known. They consist of a metal enclosure and a source of microwaves, sometimes referred to as "magnetron." A product to be heated or melted is placed in a non-conductive dielectric receptacle within enclosure. The product-receiving receptacle in the metal enclosure must not be metal.

Industries which employ organic materials, in particular the plastic industry, frequently have to melt organic products which are packed in metal containers. This is true, for instance, in the technique for manufacturing polyurethanes. In that case, prepolymers which are delivered in solid form in metal drums are polymerized. It is then necessary to reheat these products in order to melt them, but this heating must be carried out cautiously because if the temperature of the prepolymers exceeds a given value, for instance 75° C., for too long a time, these products are degraded, with the formation of, for instance, allophanates which it is necessary to avoid. One is therefore compelled to effect a progressive, limited heating.

This heating can be carried out in a stove but the heating time is very long, for instance about 72 hours for a 200 liter drum. Furthermore, the expenditure of energy is very substantial.

SUMMARY OF INVENTION

The object of the present invention is to avoid these drawbacks. Toward this end, the invention concerns a method which makes it possible to melt an organic product by means of microwaves, this method being characterized by the following features:

a) at least one waveguide is fastened to a metal receptacle containing the initial solid organic product;

b) microwaves are directed by said waveguide or waveguides in such a manner that the electromagnetic field of these microwaves is directly in contact with the free upper surface of the solid product; this electromagnetic field causes the melting of the upper part of the solid, thus forming an upper liquid layer;

c) the part of the product which is still solid and is in contact with the liquid is eroded so as to obtain particles of solid product suspended in the liquid, and this suspension is agitated;

d) the erosion and the agitation progress towards the bottom of the receptacle at the same time as the product is melted, while one continues to bring the electromagnetic field into contact with the free surface of the liquid, at least during part of the melting time;

e) the product is removed from the receptacle when it is completely melted.

The invention also concerns a device which makes it possible to melt an organic product by means of microwaves, this device being characterized by the following features:

a) It comprises at least one waveguide for microwaves, and means making it possible to fasten the waveguide or waveguides to a metallic receptacle containing the initial solid organic product;

b) the waveguide or waveguides are so arranged as to direct the microwaves in such a manner that the electromagnetic field of these microwaves is directly in contact with the free surface of the solid product; thus causing the melting of the upper part of the solid, with the formation of an upper liquid layer;

c) it comprises means making it possible to erode the part of the product which is still solid which is in contact with the liquid, these means permitting the obtaining of particles of the solid product suspended in the liquid;

d) it has means for agitating this suspension;

e) it has means making it possible to displace the erosion and agitation means towards the bottom of the receptacle at the same time as the melting proceeds, the device being so arranged that the waveguides continue to direct the electromagnetic field in contact with the free surface of the liquid upon this displacement, at least during part of the melting time;

f) it has means making it possible to cause the product to emerge from the receptacle when it is completely melted.

DESCRIPTION OF DRAWINGS

The invention will be easily understood by reference to the following non-limitative examples and the completely diagrammatic figures referring to these examples.

In the drawings.

DETAILED DESCRIPTION OF INVENTION

Figure 1:
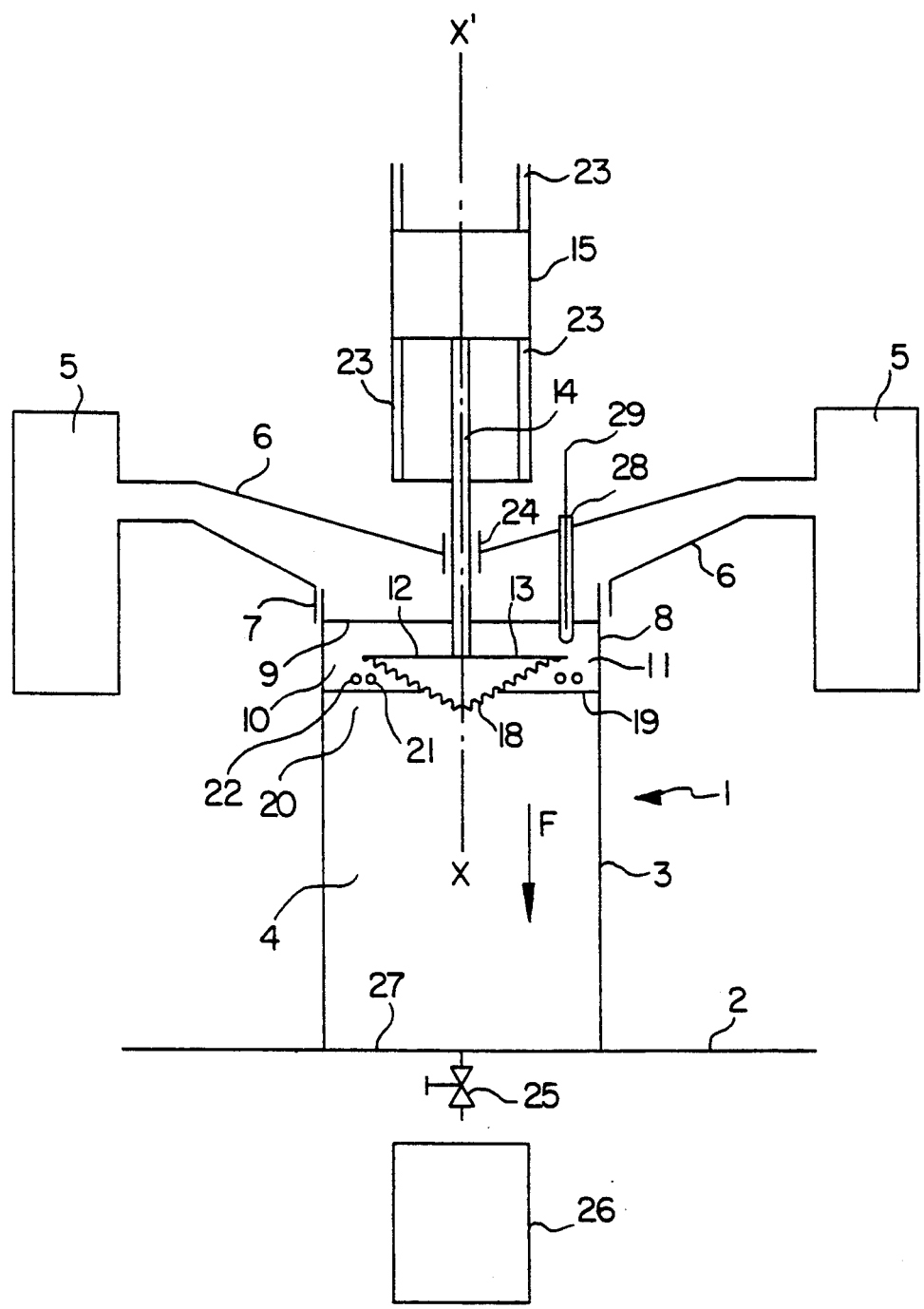
FIG. 1 is a vertical section through a device according to the invention having an erosion head.

FIG. 1 shows a device 1 in accordance with the invention. This device 1 has a plate 2 on which the receptacle 3, which is a metal drum, is placed. This receptacle 3 contains the organic product 4, which is initially in solid state. A waveguide 6 extends from each of the two microwave generators 5. By way of illustration and not of limitation, the microwave frequencies vary from 875 MHz to 2450 MHz. These two waveguides are fastened to a cover 7 which is fitted to the upper part 8 of the receptacle 3, the original cover of this receptacle 3 having been previously removed. The receptacle 3 serves as a packing container for the product 4 which has been solidified in a mass in situ in this receptacle 3, thus forming a single solid block. The cover 7 and the waveguides 6 are made for instance from stainless steel.

The microwaves are directed by the guides 6 in such a manner that the electromagnetic field of these microwaves comes directly into contact with the free surface 9 of the initially solid product 4. This field causes the melting of the upper part 10 of the product 4, which thus forms an upper liquid layer 11.

The device 1 includes means 12 for eroding the product 4. The erosion means includes an erosion head 13 connected to a vertical shaft 14.

Figure 2:
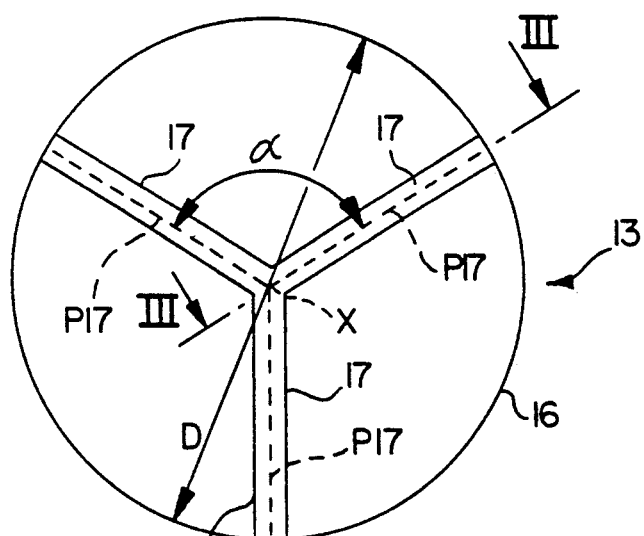
FIG. 2 is a bottom view of the erosion head of the device shown in FIG. 1, this head having blades.

The vertical axis xx' of the shaft 14 coincides with the axis of the barrel 3, FIG. 1 being a vertical section taken along the axis xx'. The motor 15 drives the shaft 14 in rotation around the axis xx', and the shaft 14 drives the head 13 in rotation around this axis xx'. FIG. 2 is a bottom view of the head 13. This head 13, of diameter D, comprises a conical part 16, the conicity of which faces upward. On this conical part 16 there are fastened three identical blades 17.

Figure 3:
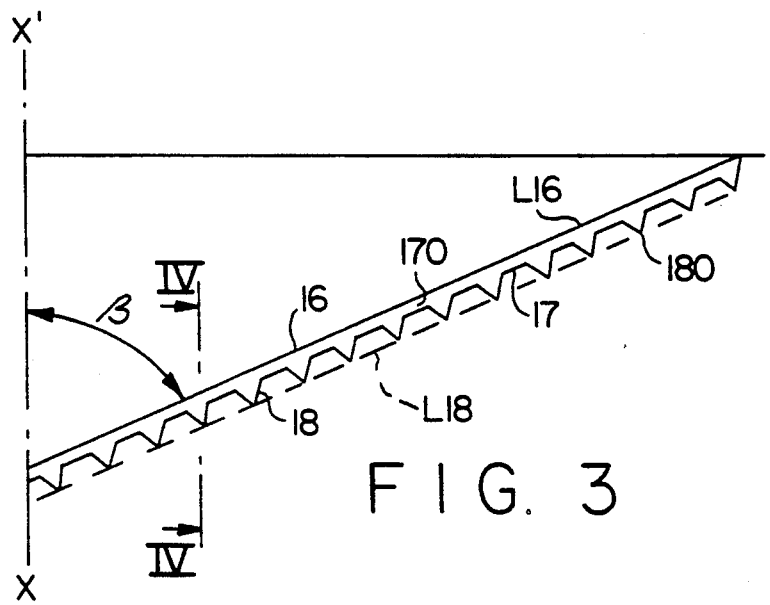
FIG. 3 is a vertical section through a part of the erosion head shown in FIG. 2, with a blade having teeth, the section of FIG. 3 being taken along the line III—III of FIG. 2.

FIG. 3 is a vertical section along the axis xx' of a part of the conical part 16 with a blade 17. Each blade 17 has the shape of a plate the upper part 170 of which connected to the part 16 has a vertical orientation. The average planes P17 of these parts 170, shown in dashed lines in FIG. 2, represent the average orientation of the corresponding blades 17 and pass through the axis xx', indicated diagrammatically by the point x in FIG. 2. Any two successive vertical planes P17 form an angle $\alpha$ of 120°. The blades 17 have teeth 18. In FIG. 3 the straight dashed line L18 joining the points 180 of the teeth 18 is directed upward extending away from the axis xx', said line L18 being, for instance, parallel to the straight line L16 corresponding to the part 16 shown in section in FIG. 3, this line L16 forming the acute angle $\beta$ with the axis xx', $\beta$ being the angle of conicity (FIG. 3), that is to say, the line L18 forms the acute angle $\beta$, which opens upward, with a vertical passing through said line. The number of blades 17 may be other than three and the angle $\alpha$ may be other than 120°. The number of teeth 18 may vary within wide limits for each blade 17.

Figure 4:
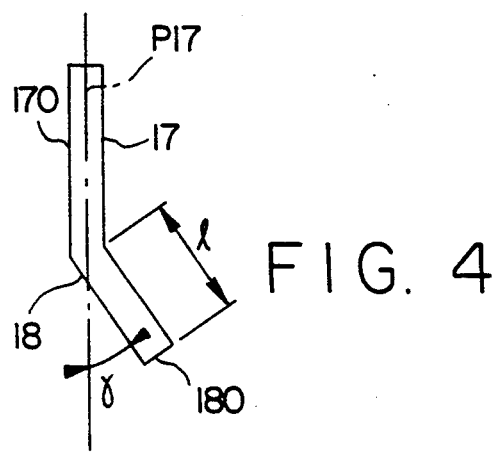
FIG. 4 is a vertical section through the blade shown in FIG. 3, the section of FIG. 4 being taken along the line IV—IV of FIG. 3.

FIG. 4 is a vertical section through the blade 17 shown in FIG. 3, this section being parallel to the axis xx' and perpendicular to the plane P17 of said blade. From FIG. 4 it can be seen that the teeth 18 which are connected to the part 170 form the angle $\gamma$ with the plane P17, these teeth 18 having the length 1 measured in the plane of FIG. 4.

The angles $\beta$ and $\gamma$ may vary within wide limits as a function of the viscosity of the liquid 11, $\beta$ being preferably at least equal to 70° and at most equal to 90°, and $\gamma$ being preferably at least equal to 30° and at most equal to 60°. The teeth 18 may, if desired, be attached directly to the conical part 16, the parts 170 not being present in such case.

Upon its rotation, the head 13 by the action of its teeth 18 erodes the solid surface 19 of the product 4 which is in contact with the liquid 11 as well as the upper portion 20 of solid 4 in the vicinity of such surface 19. This erosion, due to the action of the teeth 18, produces solid particles 21 which form a suspension 22 with the liquid 11. The head 13 also makes it possible to agitate this suspension since the oblique orientation of the teeth 18, due to the angle $\gamma$, creates a movement of the suspension 22 towards the top of the receptacle 3 which facilitates the melting of the particles 21 in contact with the hot liquid 11. The head 13 thus causes both erosion and agitation.

The device 1 therefore, through a thermomechanical action combining a melting by the action of the microwaves with an abrasion or "nibbling" of the solid 4, produces the agitated suspension 22.

The head 13 is moved vertically downward in the direction of the arrow F as the melting progresses, that is to say, as the solid surface 19 progresses towards the bottom. In order to permit this vertical movement of the head 13, the motor 15 can move vertically along guide rods 23, thus vertically displacing the shaft 14 which slides in the opening 24 of the cover 7. The means permitting the vertical displacement of the motor 15 are known means, for instance a system of racks, not shown in the drawings for purposes of simplification.

When all of the product 4 is melted, the valve 25 is opened, permitting the liquid product 4 to flow into the receptacle of use 26.

FIG. 1 shows an intermediate stage of the melting, the solid surface 19 being between the initially solid surface 9 and the bottom 27 of the receptacle 3. During at least a part of the melting time, the electromagnetic field of the microwaves is continued to be sent via the guides 6 in contact with the free liquid surface 9 of the product 4.

The device 1 of the invention can be so arranged as to regulate the melting process. For this purpose, the cover 7 has a metal tube 28 which can slide in vertical direction in order to be brought into contact with the upper part of the liquid layer 11. The tube 28 is made of material of high thermal conductivity, for instance cooper. A thermometric probe 29 is arranged in the tube 28 and thus measures the temperature of the upper part of the liquid layer 11, the probe 29 being protected from interference with the microwaves by the metal tube 28 which acts as a screen.

A knowledge of this temperature makes it possible to regulate the melting procedure by manual or automatic control. These regulating means, which are known per se and are not shown in the drawings for purposes of simplification, make it possible to vary the emission of the microwaves from the sources 5 by stopping or decreasing said emission when the temperature detected by the probe 29 reaches a predetermined maximum value. In this way, the temperature of the upper part of the liquid layer 11, that is to say, the maximum temperature of the total product 4, remains at all times at most equal to a predetermined critical value in order to avoid or limit the degradation of the product 4.

This regulation can be extended to the erosion and agitation process, the speed of rotation of the head 13 as well as possibly its vertical displacement being possibly modified manually or automatically as a function of the temperature measured by the probe 29.

The invention provides the following advantages:

The metal receptacle 3 used for packing the product 4 can be employed directly, the melting thus taking place in situ directly in the metal packing receptacle for the product;

the melting is rapid;

the expenditure of energy is low and the use of microwaves can be modulated, for instance by intermittently stopping the emission of these microwaves, resulting in great flexibility is use, which modulation may be extended to the agitation itself, that is to say, to the entire melting process;

the melting is obtained without substantial degradation of the material since the erosion and the agitation of the suspension permit a good distribution of the heat although the coupling with the electromagnetic field is greater for the liquid than for the solid.

EXAMPLES

Example 1 which is in accordance with the invention and comparative Example 2 which follow will make it possible better to understand the invention.

EXAMPLE 1

The device 1 is used to melt 200 liters of polyester prepolymer TDI, type NOURYTHANE A9 of the AKZO Company, this product 4 being intended to produce polyurethanes.

Characteristics of the device 1 and of the generators 5:

Microwave sources 5: frequency: 2450 MHz; power of each source: 1200 W.

Erosion device 12: power of the motor 15: 1100 W; diameter D of the head 13: 350 mm; angle $\beta$ of conicity: 80°; number of teeth 18: 15 for each blade 17; length 1 of the teeth: 30 mm; angle of inclination $\gamma$ of the teeth: 45°.

Characteristics of the initial product 4:
melting point: 60° C.
NCO content: 4.24%

The melting is effected by intermittently operating the sources 5 in order to avoid the temperature of the product 4 exceeding 72° C. The speed of rotation of the head 13 varies from 80 rpm to 195 rpm and the speed of vertical displacement of the head is 11 cm an hour.

The complete melting is effected in 7.4 hours. The total energy used is 30.14 kWh, namely 4000 W used for 5.5 hours in the case of the sources 5 and 1100 W used for 7.4 hours in the case of the device 12.

During the melting, the temperature of the product 4 is greater than 40° C. and less than 72° C.

The concentration of NCO in the product at the end of the melting is 4.05%, the relative variation of the concentration of NCO due to the melting operation being therefore about 4.5%.

EXAMPLE 2

In this example, which is not in accord with the invention, 200 liters of the same product as in Example 1 (NOURYTHANE A9), packed in the same manner in a metal barrel, are melted. The melting is effected in a hot air stove.

The melting takes 72 hours with an expended energy of 350 kWh. This melting by oven treatment results in a relative variation of the concentration of NCO of 3.2%.

The invention, therefore, permits a considerable saving of time and energy for the melting, practically without penalizing the product as compared with the known melting processes.

Of course, the invention is not limited to the embodiment described above.

The invention applies to any organic product or any mixture of organic products capable of being melted by the use of microwaves, such products being used, for instance, in the chemical industry, in the pharmaceutical industry, in perfumery, in the foodstuff industry, in the photographic industry and in the plastics industry. Such products are, for instance hot melts, molasses, resins and solid solutions.

We claim:

1. A device for entirely melting solid organic material in a receptacle by microwaves comprising a cover for an upper open end of the receptacle, at least one waveguide for providing a passage for the microwaves from a source to the solid organic material within the receptacle for melting the solid organic material progressively from top to bottom in the receptacle, erosion means for engaging with the solid organic material to break it up and form a suspension of particles in melted organic material and for agitating the suspension, and means for extending upwardly from said erosion means for supporting and displacing it downwardly to maintain it in eroding engagement with the solid organic material as the melting progresses.

2. A device as set forth in claim 1 in which the erosion means includes a rotatable toothed agitator engageable with the solid organic material and the said upwardly extending means includes a driven shaft accommodated in said cover for rotatable and axial movement.

3. A device as set forth in claim 1 in which the erosion means has a conical surface engaging the solid organic material for permitting upward flow of the particles within the suspension.

4. A method for entirely melting solid organic material in a receptacle by microwaves, comprising steps of conducting microwaves from a source to an upper surface of the solid organic material in the receptacle, the microwaves progressively melting the solid organic material from top to bottom in the receptacle, breaking up the solid organic material by maintaining erosion means in engagement with the upper surface of the solid material, thereby forming a suspension of particles in melted organic material, said engagement being maintained by progressively moving the erosion means against the solid material within the receptacle, and agitating the suspension by rotating the erosion means.

5. A method as set forth in claim 4 in which the erosion means is a rotatable toothed agitator displaced progressively against the solid material within the receptacle.

6. A method of melting a solid organic product in a metal receptacle comprising steps of directing microwaves into the receptacle through at least one waveguide communicating with an interior of the receptacle to establish an electromagnetic field of the microwaves directly in contact with an upper surface of the solid product in the receptacle, the microwaves melting the solid and forming an upper liquid layer above a lower unmelted solid part of the product;

eroding the solid part of the product to suspend particles of the solid product in the liquid and agitating this suspension; and continuing the erosion of the solid product, the agitation of the suspension and the presence of the microwaves in contact with the surface of the liquid during at least a part of a melting time to melt completely the solid organic product.

7. A method according to claim 6 in which the particles suspended in the liquid by erosion and agitation move upwardly in the receptacle toward the electromagnetic field to facilitate melting.

8. A method according to claim 6 including emitting the microwaves outside the receptacle, measuring the temperature of the upper liquid layer within the receptacle and regulating the emission of the microwaves directed through the waveguide as a function of said temperature.

9. A method according to claim 8 including regulating the erosion and the agitation as a function of said temperature.

10. A method according to claim 9 including regulating the progression of the erosion and agitation of the product within the receptacle from the product in the upper region to the product in the lower region of the receptacle as a function of said temperature.

11. A method as set forth in claim 6 including discharging the melted product from the receptacle.

12. A device for melting an organic product in a metal receptacle comprising at least one waveguide for directing microwaves from a source to an interior of an upper region of the receptacle, thereby establishing the microwaves in direct contact with an upper surface of a solid product which melts the upper part of the solid product forming an upper liquid layer above a lower a solid unmelted solid product, means eroding the product which is still solid to produce particles of the solid product suspended in the liquid, means for agitating a suspension and means for displacing the erosion and agitation means within the receptacle as the melting advances while the electromagnetic field continue to melt the suspended particles during at least part of a melting time.

13. A device as set forth in claim 12 in which the agitation means moves the suspended particles upwardly in the receptacle.

14. A device as set forth in claim 12 in which the erosion means includes a head which carries teeth and including drive means for imparting rotation to the head.

15. A device as set forth in claim 14 in which the head carries a plurality of blades extending outwardly of the axis of rotation of the head, the blades lying in planes substantially parallel to the axis of rotation of the head, and in which the teeth are carried on each blade to form an angle with the plane of the corresponding blade.

16. A device as set forth in claim 15 in which a blade has an inner edge and an outer end and the teeth of the blade have points arranged on a straight line which extends upwardly and outwardly from the inner edge toward the outer end of an acute angle to the inner edge.

17. A device as set forth in claim 12 including means for measuring a temperature in the upper liquid layer of the product.

18. A device as set forth in claim 17 in which the means for measuring include a metal tube and a thermometric probe arranged in said tube.

19. A device as set forth in claim 18 including means for regulating the emission of the microwaves from the source as a function of said temperature.

20. A device as set forth in claim 19 including means for regulating the erosion and agitation means as a function of said temperature.

21. A device as set forth in claim 12 including means for measuring the temperature in the upper liquid layer of the product and means for regulating, as a function of said temperature, the means for displacing the erosion and agitation means against the solid product in the receptacle.

22. A device as set forth in claim 12 including means for discharging the melted product from the receptacle.

* * * * *

UNITED STATES PATENT AND TRADEMARK OFFICE
CERTIFICATE OF CORRECTION

PATENT NO. : 5,233,146
DATED      : Aug. 3, 1993
INVENTOR(S) : Gouttebessis et al.

It is certified that error appears in the above-identified patent and that said Letters Patent is hereby corrected as shown below:

On the Title Page;
Item [57]:, 2nd line of ABSTRACT, "by" should read --by an electromagnetic field produced by--; 2nd and 3rd lines of ABSTRACT, delete "electromagnetic field produced by"; 7th and 8th lines of ABSTRACT, "Means (12) make it possible to erode" should read --A rotatable erosion device erodes--. Col. 4, bridging lines 25-26, "cooper" should read --copper--. Col. 6, line 51, "a melting time" should read --the melting time--. Col. 7, bridging lines 11-12, delete "a solid"; line 17, "electromagnetic field" should read --microwaves--; bridging lines 18-19, "a melting time" should read --the melting time--. Col. 8, line 10, "a temperature" should read --the temperature--; bridging lines 12-13, "the means for measuring" should read --means for measuring the temperature--; line 16, "claim 18" should read --claim 17--; line 17, "the emission" should read --an emission--.

Signed and Sealed this

Nineteenth Day of April, 1994

BRUCE LEHMAN

Attest:

Attesting Officer

Commissioner of Patents and Trademarks